(12) United States Patent
Akashi et al.

(10) Patent No.: US 11,489,468 B2
(45) Date of Patent: Nov. 1, 2022

(54) MOTOR SELECTION DEVICE AND MOTOR SELECTION METHOD

(71) Applicant: FANUC CORPORATION, Yamanashi (JP)

(72) Inventors: Kodai Akashi, Yamanashi-ken (JP); Hidetoshi Uematsu, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 155 days.

(21) Appl. No.: 16/926,929

(22) Filed: Jul. 13, 2020

(65) Prior Publication Data

US 2021/0021214 A1     Jan. 21, 2021

(30) Foreign Application Priority Data

Jul. 18, 2019   (JP) .............................. JP2019-132532

(51) Int. Cl.
*H02P 6/34*       (2016.01)
*G06F 30/20*      (2020.01)
(Continued)

(52) U.S. Cl.
CPC ................ *H02P 6/34* (2016.02); *G06F 17/18* (2013.01); *G06F 30/20* (2020.01); *G06F 2111/10* (2020.01)

(58) Field of Classification Search
CPC . H02P 6/34; G06F 30/20; G06F 17/18; G06F 2111/10
See application file for complete search history.

(56) References Cited

U.S. PATENT DOCUMENTS

2005/0168186 A1   8/2005   Matsubara et al.
2010/0305751 A1   12/2010  Nagatsuka et al.
(Continued)

FOREIGN PATENT DOCUMENTS

EP    2544353 A1      1/2013
JP    2004-336871     11/2004
(Continued)

OTHER PUBLICATIONS

Furqani J, Kawa M, Wiguna CA, Kawata N, Kiyota K, Chiba A. Current reference selection for acoustic noise reduction in two switched reluctance motors by flattening radial force sum. IEEE Transactions on Industry Applications. Apr. 11, 2019;55(4):3617-29. (Year: 2019).*

(Continued)

*Primary Examiner* — Chuen-Meei Gan
(74) *Attorney, Agent, or Firm* — Robert P. Michal, Esq.; Carter, DeLuca & Farrell LLP (57) ABSTRACT

A motor selection device is equipped with a speed calculation unit that calculates an average speed from a speed waveform of a motor that drives a predetermined driven object, the speed waveform being obtained when the driven object is made to perform a prescribed operation, a current calculation unit that calculates a root mean square current from a current waveform of the motor that drives the driven object, the current waveform being obtained when the driven object is made to perform the prescribed operation, a storage unit that stores a motor characteristic corresponding to a speed of a target motor serving as an object to be selected, and a determination unit that determines whether or not the prescribed operation by the target motor is possible, using the motor characteristic corresponding to the average speed, and the root mean square current.

6 Claims, 11 Drawing Sheets

(51) Int. Cl.
    *G06F 17/18*      (2006.01)
    *G06F 111/10*     (2020.01)

(56) References Cited

U.S. PATENT DOCUMENTS

2012/0280645 A1* 11/2012 Olsson .................. H02P 27/047
                                                    318/802
2018/0267501 A1*  9/2018 Yamada ............... G05B 19/404

FOREIGN PATENT DOCUMENTS

| JP | 2005-219133 A | 8/2005 |
| JP | 2011-005623 A | 1/2011 |
| JP | 2011-188581 A | 9/2011 |
| JP | 2018-153045 A | 9/2018 |

OTHER PUBLICATIONS

Kurihara N, Chiba A, Yamada K, Souda A. A relationship of radial force sum and current waveforms in switched reluctance motor for noise reduction. In2015 IEEE Energy Conversion Congress and Exposition (ECCE) Sep. 20, 2015 (pp. 5560-5566). IEEE. (Year: 2015).*

Piccoli M, Yim M. Anticogging: Torque ripple suppression, modeling, and parameter selection. The international journal of robotics research. Jan. 2016;35(1-3):148-60. (Year: 2016).*

Domijan Jr A, Czarkowski D. Challenges in electrical power measurements of adjustable speed drives and motors. ASHRAE journal. Feb. 1, 1997;39(2):32. (Year: 1997).*

* cited by examiner

FIG. 11

MOTOR SELECTION DEVICE AND MOTOR SELECTION METHOD

CROSS-REFERENCE TO RELATED APPLICATION

This application is based upon and claims the benefit of priority from Japanese Patent Application No. 2019-132532 filed on Jul. 18, 2019, the contents of which are incorporated herein by reference.

BACKGROUND OF THE INVENTION

Field of the Invention

The present invention relates to a motor selection device and a motor selection method for selecting an appropriate motor.

Description of the Related Art

As disclosed in Japanese Laid-Open Patent Publication No. 2018-153045, in a conventional motor selection device, motor selection is performed by determining whether or not a root mean square torque during execution of an operation pattern is less than the rated torque of the motor.

SUMMARY OF THE INVENTION

However, in the technique disclosed in Japanese Laid-Open Patent Publication No. 2018-153045, a speed waveform is used to obtain the root mean square torque, and the reactive current component in the current flowing through the motor is not taken into consideration. On the other hand, the rated torque is measured by actually driving the motor, and an influence of the reactive current component is included therein. Thus, the reactive current component is not treated properly when the two torques are compared, and the degree of accuracy of the determination is low.

Thus, the present invention has the object of providing a motor selection device and a motor selection method, in which it is possible to select a motor in consideration of a reactive current component flowing through the motor.

A first aspect of the present invention is characterized by a motor selection device, comprising a speed calculation unit configured to calculate an average speed from a speed waveform of a motor configured to drive a predetermined driven object, the speed waveform being obtained when the driven object is made to perform a prescribed operation, a current calculation unit configured to calculate a root mean square current from a current waveform of the motor configured to drive the driven object, the current waveform being obtained when the driven object is made to perform the prescribed operation, a storage unit configured to store a motor characteristic corresponding to a speed of a target motor serving as an object to be selected, and a determination unit configured to determine whether or not the prescribed operation by the target motor is possible, using the motor characteristic corresponding to the average speed, and the root mean square current.

A second aspect of the present invention is characterized by a motor selection method for a motor selection device comprising a storage unit, the storage unit being configured to store a motor characteristic corresponding to a speed of a target motor serving as an object to be selected, the motor selection method comprising a speed calculation step of calculating an average speed from a speed waveform of a motor configured to drive a predetermined driven object, the speed waveform being obtained when the driven object is made to perform a prescribed operation, a current calculation step of calculating a root mean square current from a current waveform of the motor configured to drive the driven object, the current waveform being obtained when the driven object is made to perform the prescribed operation, and a determination step of determining whether or not the prescribed operation by the target motor is possible, using the motor characteristic corresponding to the average speed, and the root mean square current.

According to the present invention, it is possible to select a motor in consideration of a reactive current component flowing through the motor.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments in relation to a motor selection device and a motor selection method according to the present invention will be presented and described in detail below with reference to the accompanying drawings.

[Embodiments]

Figure 1:
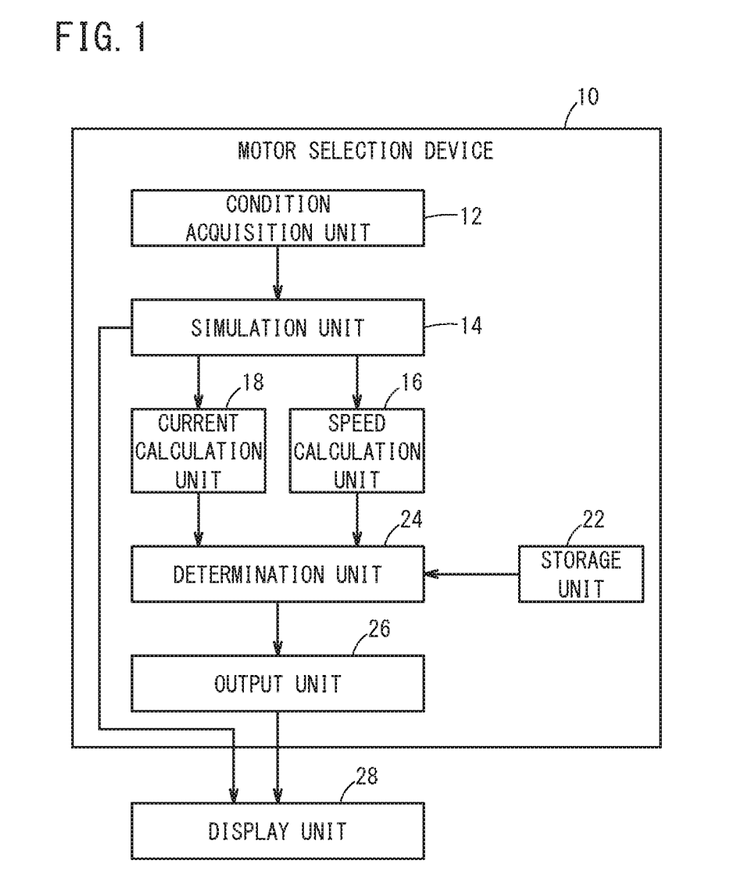
FIG. 1 is a schematic configuration diagram of a motor selection device according to an embodiment.

FIG. 1 is a schematic configuration diagram of a motor selection device 10 according to an embodiment of the present invention. The motor selection device 10 is a device that provides assistance in selecting a motor, by indicating to a user whether or not a motor serving as an object to be selected satisfies an ability required for a motor that drives a driven object when the driven object is made to perform a prescribed operation.

The motor selection device 10 is equipped with a condition acquisition unit 12, a simulation unit 14, a speed calculation unit 16, a current calculation unit 18, a storage unit 22, a determination unit 24, and an output unit 26. The motor selection device 10 includes a processor such as a CPU or the like and a memory, and functions as the motor selection device 10 of the present embodiment by executing a program stored in the memory. A display unit 28 is installed externally of the motor selection device 10, and the display unit 28 displays the output results from the simulation unit 14 and the output unit 26. It should be noted that the display unit 28 may also be provided as a portion of the motor selection device 10.

The condition acquisition unit 12 acquires a mechanical condition of a driven object (not shown) that is driven by a motor (not shown), and an operation condition indicating a prescribed operation pattern, the conditions being input by the user. The driven object is all driven members that are driven by the motor. A ball screw mechanism is disposed at a distal end of the motor, and due to rotary motion of the motor, a table on which a nut is installed is made to undergo linear movement. Accordingly, the driven members include a ball screw, the nut, the table, and a workpiece or the like that is mounted on the table. Further, in the following description, a rotation speed of the motor may be simply referred to as a speed.

The mechanical condition acquired by the condition acquisition unit 12 is a physical quantity related to the driven object, and includes parameters such as a length and a diameter of the ball screw, the masses of the table and the workpiece, and a coefficient of friction. The operation condition acquired by the condition acquisition unit 12 includes parameters that define a prescribed operation pattern, such as a movement distance, and a speed of movement of the table and the workpiece. Since the prescribed operation by a predetermined driven object is determined by the mechanical condition and the operation condition acquired by the condition acquisition unit 12, the condition acquisition unit 12 outputs the acquired mechanical condition and operation condition to the simulation unit 14.

The simulation unit 14 obtains, by way of a simulation, a speed waveform, a torque waveform, and a current waveform of the motor that drives the predetermined driven object, when the driven object is made to perform the prescribed operation based on the mechanical condition and the operation condition input by the condition acquisition unit 12.

Figure 2:
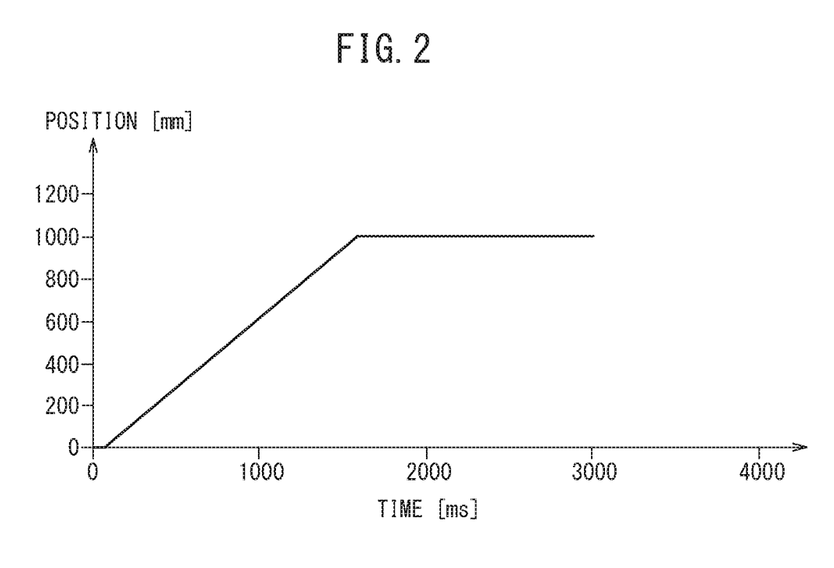
FIG. 2 is a diagram showing an operation pattern of a driven object determined in accordance with operating conditions.

FIG. 2 is a diagram showing an operation pattern of the driven object determined in accordance with operating conditions. In FIG. 2, the horizontal axis represents time, and the vertical axis represents the position of the table (or the workpiece). In FIG. 2, an operation pattern is shown in which, during a predetermined time period, the table (or the workpiece) moves 1 m in a predetermined direction and comes to a stop.

Figure 3:
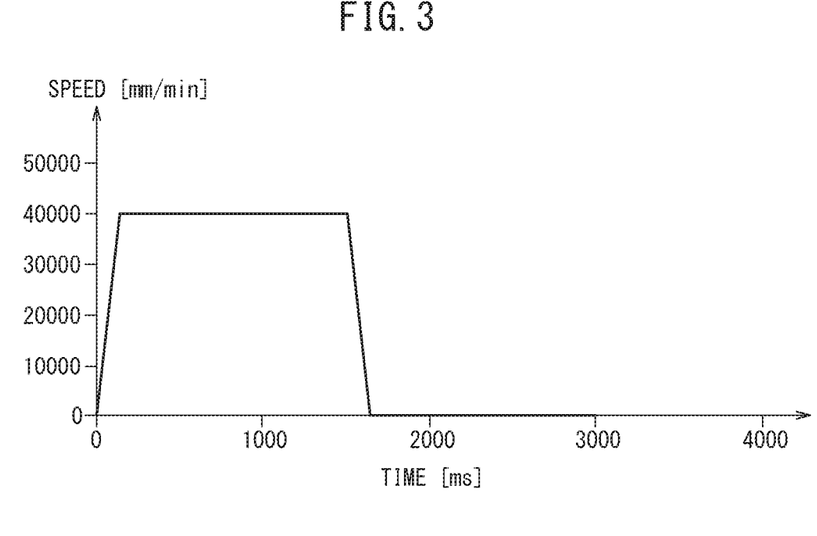
FIG. 3 is a diagram showing a speed waveform of the driven object obtained by way of a simulation.
Figure 4:
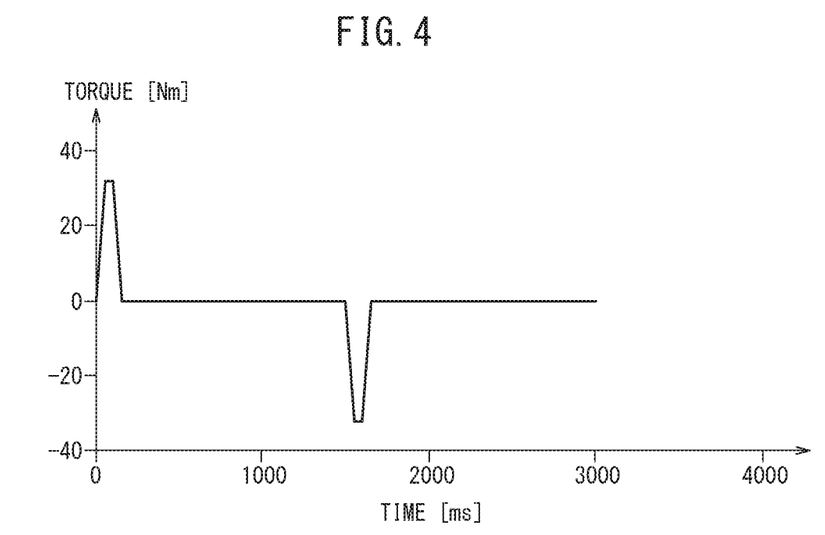
FIG. 4 is a diagram showing a torque waveform of a motor obtained by way of a simulation.
Figure 5:
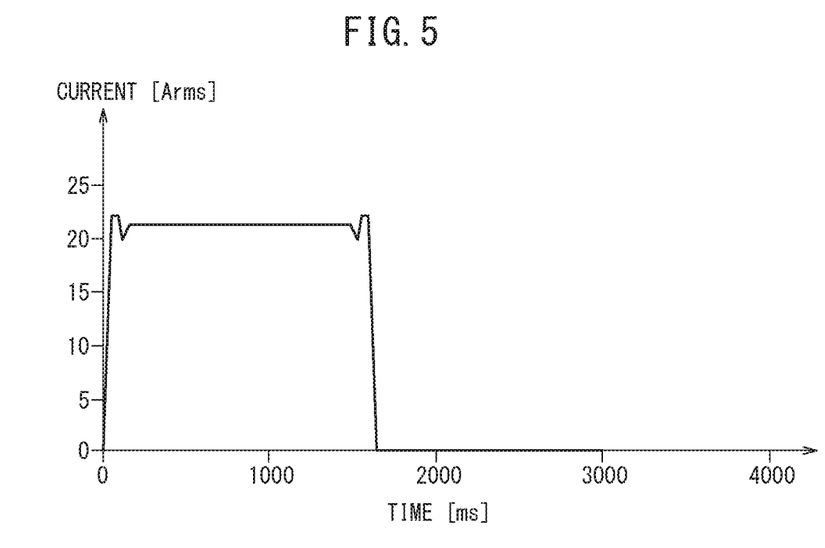
FIG. 5 is a diagram showing a current waveform of a motor obtained by way of a simulation.

FIG. 3 is a diagram showing a speed waveform of the driven object obtained by way of a simulation. In FIG. 3, the horizontal axis represents time, and the vertical axis represents the speed of the table (or the workpiece). Accordingly, in FIG. 3, if the units of the vertical axis are changed, the speed waveform of the motor is obtained. FIG. 4 is a diagram showing a torque waveform of the motor obtained by way of a simulation. In FIG. 4, the horizontal axis represents time, and the vertical axis represents the torque of the motor. FIG. 5 is a diagram showing a current waveform of the motor obtained by way of a simulation. In FIG. 5, the horizontal axis represents time, and the vertical axis represents the current of the motor. As shown in FIGS. 3, 4, and 5, the simulation unit 14 obtains a rotation speed waveform, a torque waveform, and a current waveform of the motor when the driven object is made to execute the operation shown in FIG. 2, and displays, on the display unit 28, the waveforms together with FIG. 2, which can be shown to the user.

The speed calculation unit 16 calculates an average speed from the speed waveform of the motor obtained by way of the simulation of the simulation unit 14. The speed calculation unit 16 may calculate the average speed by performing an arithmetic mean calculation from speed values taken at a plurality of times selected by the speed waveform, or may calculate the average speed by a root mean square calculation. The average speed may be a value obtained by executing a certain averaging calculation based on the speed waveform.

The current calculation unit 18 calculates a root mean square current from the current waveform obtained by way of the simulation of the simulation unit 14, and outputs the root mean square current to the determination unit 24. In this instance, the calculated root mean square current is a value including an effective current component and a reactive current component.

Figure 6:
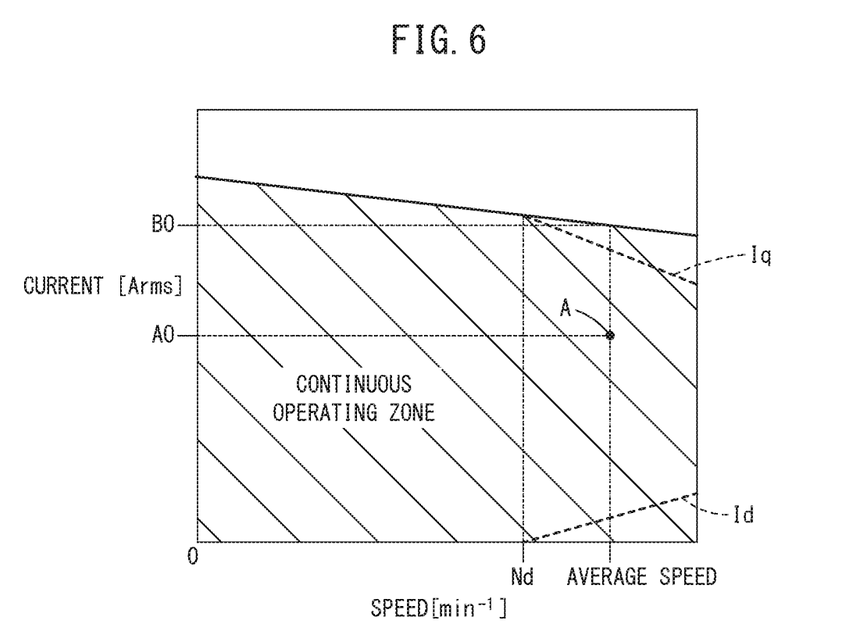
FIG. 6 is a diagram showing a rated current corresponding to a speed of a target motor.

The storage unit 22 stores the motor characteristic corresponding to the speed of the target motor serving as the object to be selected. In this instance, the motor characteristic stored in the storage unit 22 is a rated current. Accordingly, the storage unit 22 stores a relationship between a rated current corresponding to a speed and each of a plurality of motors. The rated currents stored in the storage unit 22 include the effective current component and the reactive current component. FIG. 6 is a diagram showing a rated current corresponding to a speed of a target motor. In FIG. 6, the vertical axis represents the current, the horizontal axis represents the speed, and the rated current is indicated by the solid line. Since the target motor is capable of being continuously operated at a current of less than or equal to the rated current at each of respective speeds, the zone of such a current is shown as a continuous operating zone. Further, an aspect is shown in which a reactive current component $I_d$ (dashed line) is generated at a speed of Nd or higher, and in accordance therewith, an effective current component $I_q$ (dashed line) included within the rated current decreases.

The determination unit 24, using the motor characteristic corresponding to the average speed, and the root mean square current, determines whether or not the prescribed operation of the driven object by the target motor is possible. More specifically, the determination unit 24 compares the root mean square current obtained from the current calculation unit 18, and the rated current corresponding to the average speed of the target motor obtained by accessing the storage unit 22. Then, the determination unit 24 determines whether or not the root mean square current is less than or equal to the above-described rated current. If the root mean square current is less than or equal to the rated current, a determination is made that the target motor can be used to cause the predetermined driven object to perform the prescribed operation. If the root mean square current is greater than the rated current, a determination is made that the target motor cannot be used to cause the predetermined driven object to perform the prescribed operation. In this instance, the target motor which is the subject of such a comparison is a motor serving as an object to be selected, which is selected from among a plurality of motors for which the storage unit 22 stores relationships between the rated currents corresponding to the speeds and the motors.

For example, as shown in FIG. 6, if the value of the root mean square current calculated by the current calculation unit 18 is A0, a point A at which the value of the root mean square current is A0 at the average speed calculated by the speed calculation unit 16 is included in the continuous operating zone. In this case, since the root mean square current A0 is less than or equal to a rated current value B0 corresponding to the average speed calculated by the speed calculation unit 16, the determination unit 24 determines that the prescribed operation of the driven object by the target motor is possible. Conversely, if the root mean square current A0 is greater than the rated current value B0 corresponding to the average speed, the determination unit 24 determines that the prescribed operation of the driven object by the target motor is impossible. The determination unit 24 outputs the above-described determination result to the output unit 26.

The output unit 26 outputs a notification signal to provide a notification of the determination result from the determination unit 24. By the display unit 28 displaying the content of the notification signal output by the output unit 26, a notification is issued to the user as to whether or not the target motor can be used.

Figure 7:
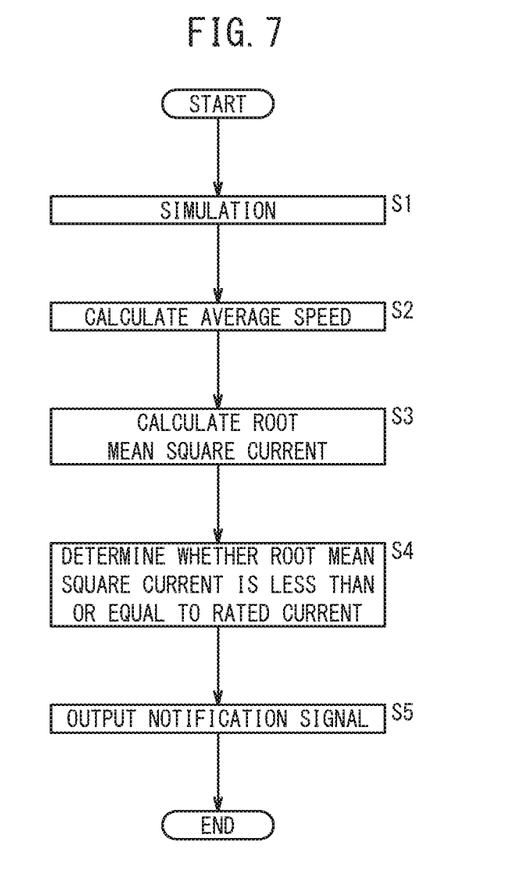
FIG. 7 is a flowchart illustrating a motor selection method according to an embodiment.

FIG. 7 is a flowchart illustrating a motor selection method according to the embodiment. Prior to the flowchart of FIG. 7 being started, the condition acquisition unit 12 outputs the acquired mechanical condition and operation condition to the simulation unit 14.

First, the simulation unit 14 simulates the speed waveform, the torque waveform, and the current waveform of the motor that drives the predetermined driven object, when the driven object is made to perform the prescribed operation based on the mechanical condition and the operation condition input by the condition acquisition unit 12 (step S1).

Next, the speed calculation unit 16 calculates the average speed from the speed waveform obtained in step S1, and outputs the average speed to the determination unit 24 (step S2).

The current calculation unit 18 calculates the root mean square current from the current waveform obtained in step S1, and outputs the root mean square current to the determination unit 24 (step S3).

The determination unit 24 compares the root mean square current calculated by the current calculation unit 18, and the rated current of the target motor corresponding to the average speed determined by the speed calculation unit 16, and determines whether or not the root mean square current is less than or equal to the rated current (step S4). The determination unit 24 outputs, to the output unit 26, the determination result based on the determination made in step S4 and concerning whether or not the prescribed operation of the driven object by the target motor is possible.

The output unit 26 outputs the notification signal to provide the notification of the determination result of the determination unit 24 (step S5), and causes the content of the notification signal to be displayed on the display unit 28.

As has been described above, the motor selection device 10 of the present embodiment compares the root mean square current, and the rated current of the motor serving as the object to be selected corresponding to the average speed. In addition, by determining whether or not the root mean square current is less than or equal to the rated current, a determination is made as to whether or not the prescribed operation of the driven object by the target motor is possible. In accordance with such features, since values including the effective current component and the reactive current component are compared with each other, it is possible to select the motor while taking into consideration the reactive current component flowing through the motor. As a result, it is possible to carry out selection of the motor more appropriately than in the conventional technique.

[Modifications]

The above-described embodiment may be modified in the following manner.

(Modification 1)

Figure 8:
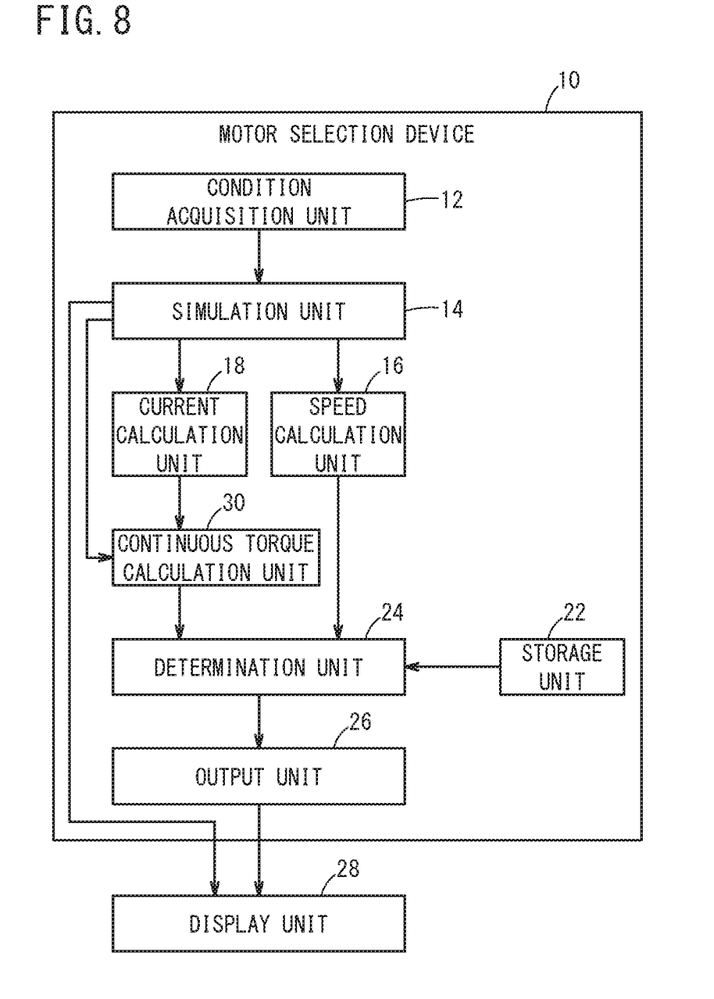
FIG. 8 is a schematic configuration diagram of a motor selection device according to a first modification.

FIG. 8 is a schematic configuration diagram of a motor selection device 10 according to a first modification (Modification 1). In the motor selection device 10 shown in FIG. 8, a continuous torque calculation unit 30 is added to the motor selection device 10 of FIG. 1. In the above-described embodiment, the motor selection device 10 compares the root mean square current in which the effective current component and the reactive current component are included, and the rated current in which the effective current component and the reactive current component are included, whereby a determination is made as to whether or not the prescribed operation by the target motor is possible. Consequently, the motor can be selected while taking into consideration the reactive current component. In Modification 1, the motor selection device 10 converts the root mean square current in which the reactive current component is included into a continuous torque, and by comparing the continuous torque with a rated torque, determines whether or not the prescribed operation by the target motor is possible.

Figure 9:
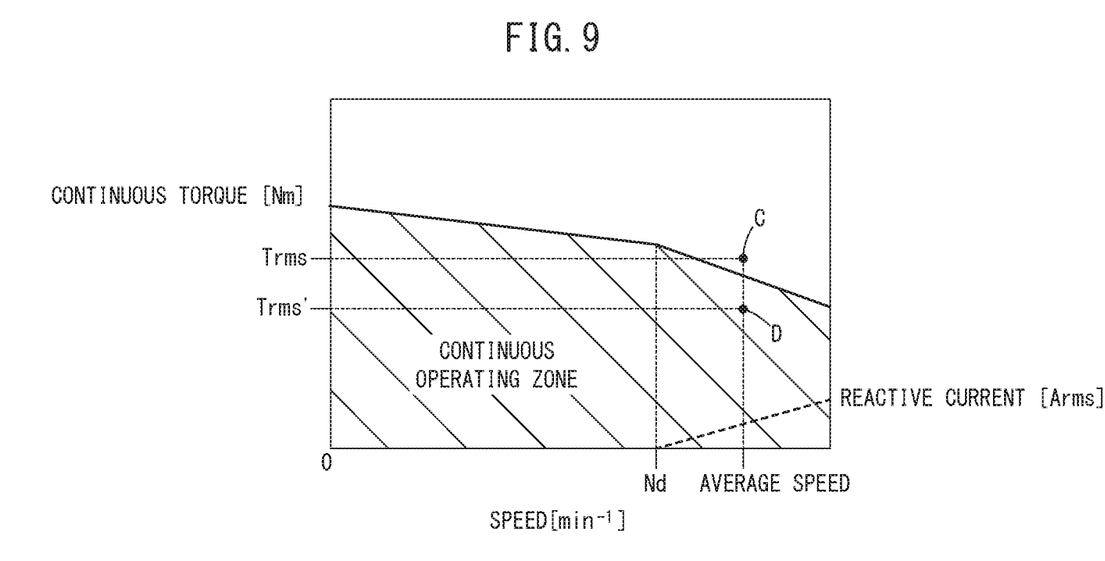
FIG. 9 is a diagram showing a rated torque corresponding to a speed of a target motor according to the first modification.

The continuous torque calculation unit 30 calculates the continuous torque in consideration of the reactive current component, from the root mean square current that has been input from the current calculation unit 18, and outputs the calculated continuous torque to the determination unit 24. Furthermore, according to Modification 1, the storage unit 22 stores the rated torque as the motor characteristic. FIG. 9 is a diagram showing a rated torque corresponding to the speed of a target motor according to Modification 1. In FIG. 9, the vertical axis represents the continuous torque, the horizontal axis represents the speed, and the rated torque is indicated by the solid line. Since the target motor is capable of being continuously operated at a continuous torque of less than or equal to the rated torque at each of respective speeds, the zone of such a rated torque is shown as a continuous operating zone. Furthermore, an aspect is shown in which the reactive current component flows at a speed of Nd or higher, and the rated torque is further reduced by the reactive current component (dashed line) at the speed of Nd or higher.

A specific procedure by which the continuous torque calculation unit 30 calculates the continuous torque from the root mean square current in consideration of the reactive current component will be described below. A root mean square current $I_{rms}$ is defined by the following equation (1). In equation (1), the term $I_a$ represents a function the variable of which is time, and which indicates the current waveform obtained by way of the simulation of the simulation unit 14.

$$I_{rms} = \sqrt{\frac{\int I_a^2 dt}{t}} \quad (1)$$

In this instance, a continuous torque $T_{rms}$ can be calculated by the following equation (2) from the root mean square current $I_{rms}$. In equation (2), the term $K_t$ is a torque constant.

$$T_{rms} = K_t \cdot I_{rms} \quad (2)$$

In this instance, the continuous torque calculation unit 30 is capable of determining, from the rotation speed obtained from the speed waveform obtained by way of the simulation and the continuous torque $T_{rms}$, a reactive current component $I_{d\ at\ Nmean}$ at the average speed, which is determined by the speed calculation unit 16. In addition, the continuous torque calculation unit 30 calculates a continuous torque $T_{rms}'$ by removing, from the root mean square current $I_{rms}$, the reactive current component $I_{d\ at\ Nmean}$ at the average speed, as in the following equation (3).

$$T_{rms}'=K_t\sqrt{(I_{rms}^2-I_{datNmean}^2)} \quad (3)$$

In FIG. 9, a point C is a point at which the continuous torque value becomes $T_{nm}$ at the average speed, and a point D is a point at which the continuous torque value becomes $T_{rms}'$ at the average speed.

In addition, the determination unit 24 compares the continuous torque $T_{rms}'$ obtained from the continuous torque calculation unit 30, and the rated torque corresponding to the average speed of the target motor obtained by accessing the storage unit 22. Further, the determination unit 24 determines whether or not the continuous torque $T_{rms}'$ is less than or equal to the rated torque. If the continuous torque $T_{rms}'$ is less than or equal to the rated torque, a determination is made that the target motor can be used to cause the predetermined driven object to perform the prescribed operation. If the continuous torque $T_{rms}'$ is greater than the rated torque, a determination is made that the target motor cannot be used to cause the predetermined driven object to perform the prescribed operation. In FIG. 9, it is considered inappropriate in the first place to compare the continuous torque $T_{rms}$ (point C) with the rated torque, because the rated torque is already reduced by an amount corresponding to the reactive current component $I_{d\ at\ Nmean}$ at the average speed. However, according to Modification 1, the continuous torque $T_{rms}'$ (point D) is calculated by performing a conversion in which the value of $I_{d\ at\ Nmean}$ is removed from the root mean square current $I_{rms}$, and the continuous torque $T_{rms}'$ is compared with the rated torque, whereby an accurate evaluation can be made and a result in which the target motor is capable of being selected can be obtained.

Figure 10:
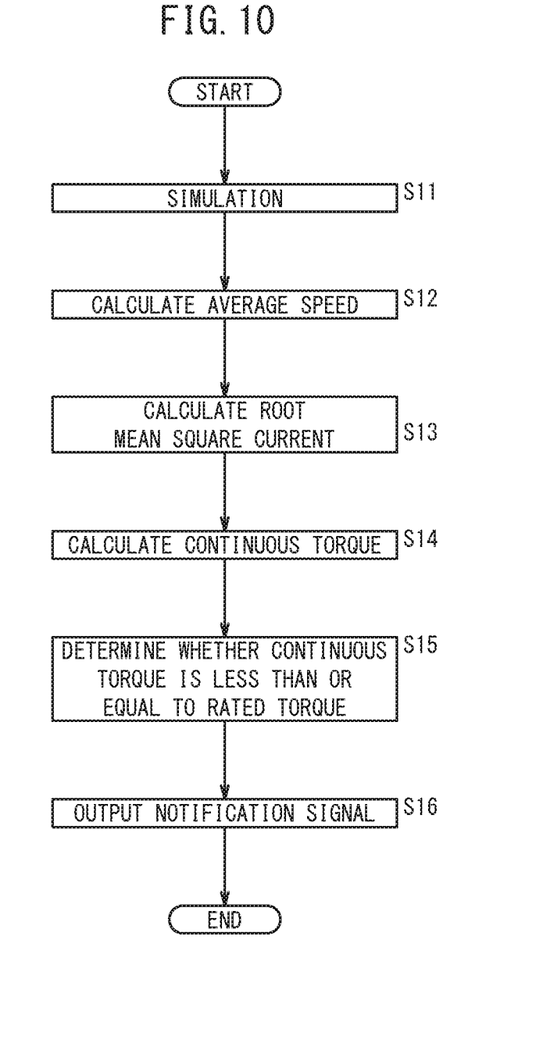
FIG. 10 is a flowchart illustrating a motor selection method according to the first modification.

FIG. 10 is a flowchart illustrating a motor selection method according to Modification 1. Prior to the flowchart of FIG. 10 being started, the condition acquisition unit 12 outputs the acquired mechanical condition and operation condition to the simulation unit 14. Steps S11, S12, S13, and S16 are the same as steps S1, S2, S3, and S5 of FIG. 7, and therefore description of these steps is omitted. Hereinafter, a description will be given concerning steps that differ from those shown in FIG. 7.

In step S14, the continuous torque calculation unit 30 calculates the continuous torque $T_{rms}'$ by removing the reactive current component $I_{d\ at\ Nmean}$ obtained in the manner described above from the root mean square current $I_{rms}$ that has been input from the current calculation unit 18, and outputs the calculated continuous torque $T_{rms}'$ to the determination unit 24.

In step S15, the determination unit 24 compares the continuous torque $T_{rms}'$ calculated by the continuous torque calculation unit 30, and the rated torque of the target motor corresponding to the average speed determined by the speed calculation unit 16, and determines whether or not the continuous torque $T_{rms}'$ is less than or equal to the rated torque. The determination unit 24 outputs, to the output unit 26, the determination result based on the determination made in step S15 and concerning whether or not the prescribed operation of the driven object by the target motor is possible.

In the foregoing manner, according to Modification 1, the motor selection device 10 compares the continuous torque $T_{rms}'$, which was obtained by removing the reactive current component $I_{d\ at\ Nmean}$ from the root mean square current $I_{rms}$, and the rated torque in which the torque component due to the reactive current component is not included. Consequently, since values that do not include the torque component due to the reactive current component are compared with each other, it is possible to select the motor while taking into consideration the reactive current component flowing through the motor. As a result, it is possible to carry out selection of the motor more appropriately than in the conventional technique.

(Modification 2)

Figure 11:
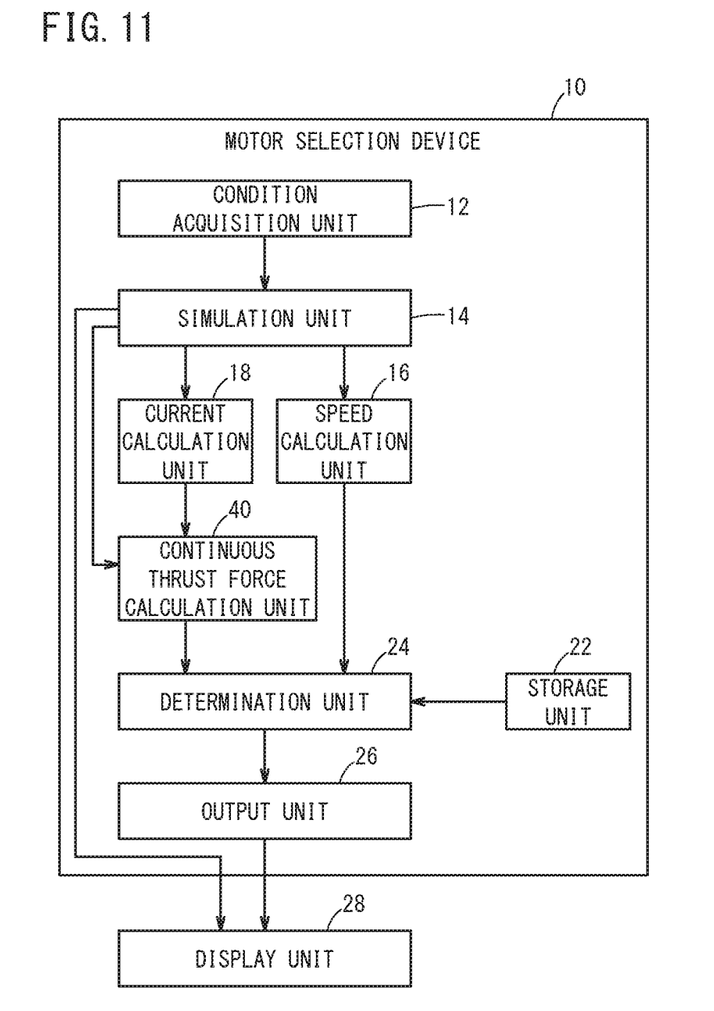
FIG. 11 is a schematic configuration diagram of a motor selection device according to a second modification.

In the above-described embodiment, the motor is assumed to be a rotating motor. However, according to a second modification (Modification 2), the motor is assumed to be a linear motor that does not undergo rotational movement. FIG. 11 is a schematic configuration diagram of a motor selection device 10 according to Modification 2. In the motor selection device 10 shown in FIG. 11, the continuous torque calculation unit 30 shown in FIG. 8 is replaced by a continuous thrust force calculation unit 40. In Modification 2, the motor selection device 10 converts the root mean square current in which the reactive current component is included into a continuous thrust force, and by comparing the continuous thrust force with a rated thrust force, determines whether or not the prescribed operation by the target motor is possible.

The continuous thrust force calculation unit 40 calculates the continuous thrust force in consideration of the reactive current component, from the root mean square current that has been input from the current calculation unit 18, and outputs the calculated continuous thrust force to the determination unit 24. Furthermore, according to Modification 2, the storage unit 22 stores the rated thrust force as the motor characteristic.

A specific procedure by which the continuous thrust force calculation unit 40 calculates the continuous thrust force from the root mean square current in consideration of the reactive current component will be described below.

First, a continuous thrust force $F_{rms}$ can be calculated by the following equation (4) from the root mean square current $I_{rms}$ of equation (1) output by the current calculation unit 18. In equation (4), the term $K_f$ is a thrust force constant.

$$F_{rms}=K_f I_{rms} \quad (4)$$

In this instance, the continuous thrust force calculation unit 40 is capable of determining, from the speed of the motor obtained from the speed waveform obtained by way of the simulation and the continuous thrust force $F_{rms}$, the reactive current component $I_{d\ at\ Nmean}$ at the average speed, which is determined by the speed calculation unit 16. In addition, the continuous thrust force calculation unit 40 calculates a continuous thrust force $F_{rms}'$ by removing, from the root mean square current $I_{rms}$, the reactive current component $I_{d\ at\ Nmean}$ at the average speed, as in the following equation (5).

$$F_{rms}'=K_f\sqrt{(I_{rms}^2-I_{datNmean}^2)} \quad (5)$$

In addition, the determination unit 24 compares the continuous thrust force $F_{rms}'$ obtained from the continuous thrust force calculation unit 40, and the rated thrust force corresponding to the average speed of the target motor obtained by accessing the storage unit 22. Further, the determination unit 24 determines whether or not the continuous thrust force $F_{rms}'$ is less than or equal to the rated thrust force. If the continuous thrust force $F_{rms}'$ is less than or equal to the rated thrust force, a determination is made that the target motor can be used to cause the predetermined driven object to perform the prescribed operation. If the continuous thrust force $F_{rms}'$ is greater than the rated thrust force, a determination is made that the target motor cannot be used to cause the predetermined driven object to perform the prescribed operation. According to Modification 2, since the continuous thrust force $F_{rms}'$ is calculated by performing a conversion in which the value of $I_{d\ at\ Nmean}$ is removed from the root mean square current $I_{rms}$, and the continuous thrust force $F_{rms}'$ is compared with the rated torque, whereby an accurate evaluation can be made and a result in which the target motor is capable of being selected can be obtained.

The motor selection method of Modification 2 can be described by replacing step S14 in the flowchart of FIG. 10 by a step in which the continuous thrust force calculation unit 40 calculates the continuous thrust force $F_{rms}'$, and by replacing step S15 by a step in which the determination unit 24 determines whether or not the continuous thrust force $F_{rms}'$ is less than or equal to the rated thrust force of the target motor corresponding to the average speed.

In the foregoing manner, according to Modification 2, the motor selection device 10 compares the continuous thrust force $F_{rms}'$, which is obtained by removing the reactive current component $I_{d\ at\ Nmean}$ from the root mean square current $I_{rms}$, and the rated thrust force in which the thrust force component due to the reactive current component is not included. Consequently, since values that do not include the thrust force component due to the reactive current component are compared with each other, it is possible to select the motor while taking into consideration the reactive current component flowing through the motor. As a result, it is possible to carry out selection of the motor more appropriately than in the conventional technique.

(Modification 3)

In the above-described embodiment and Modification 1, the speed waveform, the torque waveform, and the current waveform of the motor are obtained by way of the simulation which is executed by the simulation unit 14. However, actually measured values that are acquired in advance may also be used. Based on such measured values, the speed calculation unit 16, the current calculation unit 18, and the continuous torque calculation unit 30 may calculate the average speed, the root mean square current, and the continuous torque, respectively. Consequently, the simulation can be omitted.

(Modification 4)

The above-described embodiment and the modifications thereof may be appropriately combined within a range in which no technical inconsistencies occur.

[Inventions that can be Obtained from the Embodiments]

A description will be given below concerning the inventions that can be grasped from the above-described embodiments.

(First Invention)

The motor selection device (10) is equipped with the speed calculation unit (16) that calculates an average speed from a speed waveform of a motor that drives a predetermined driven object, the speed waveform being obtained when the driven object is made to perform a prescribed operation, the current calculation unit (18) that calculates the root mean square current from a current waveform of the motor that drives the driven object, the current waveform being obtained when the driven object is made to perform the prescribed operation, the storage unit (22) that stores the motor characteristic corresponding to the speed of a target motor serving as an object to be selected, and the determination unit (24) that determines whether or not the prescribed operation by the target motor is possible, using the motor characteristic corresponding to the average speed, and the root mean square current.

In accordance with such features, it is possible to select the motor while taking into consideration the reactive current component flowing through the motor. As a result, it is possible to carry out selection of the motor more appropriately than in the conventional technique.

The motor characteristic may be a rated current. The determination unit (24) may determine whether or not the prescribed operation by the target motor is possible by determining whether or not the root mean square current is less than or equal to the rated current of the target motor corresponding to the average speed. In accordance with such features, since values including the effective current component and the reactive current component are compared with each other, it is possible to select the motor while taking into consideration the reactive current component flowing through the motor.

The motor characteristic may be a rated torque or a rated thrust force. The motor selection device (10) may further comprise the continuous torque calculation unit (30) or the continuous thrust force calculation unit (40) that calculates the continuous torque or the continuous thrust from the root mean square current in consideration of the reactive current component, and the determination unit (24) may determine whether or not the prescribed operation by the target motor is possible by determining whether or not the continuous torque or the continuous thrust force is less than or equal to the rated torque or the rated thrust force of the target motor corresponding to the average speed. In accordance with such features, since values that do not include the torque component or the thrust force component due to the reactive current component are compared with each other, it is possible to select the motor while taking into consideration the reactive current component flowing through the motor.

The motor selection device (10) may further comprise the output unit (26) that outputs the notification signal to provide the notification of the determination result of the determination unit (24). In accordance with this feature, it is possible to provide a notification to the user as to whether or not the target motor can be used.

(Second Invention)

In the motor selection method for the motor selection device (10) which includes the storage unit (22), the storage unit (22) stores the motor characteristic corresponding to the speed of the target motor serving as the object to be selected, and there are included the speed calculation step of calculating the average speed from a speed waveform of the motor configured to drive a predetermined driven object, the speed waveform being obtained when the driven object is made to perform a prescribed operation, the current calculation step of calculating the root mean square current from a current waveform of the motor configured to drive the driven object, the current waveform being obtained when the driven object is made to perform the prescribed operation, and the determination step of determining whether or not the prescribed operation by the target motor is possible, using the motor characteristic corresponding to the average speed, and the root mean square current.

In accordance with such features, it is possible to select the motor while taking into consideration the reactive current component flowing through the motor. As a result, it is possible to carry out selection of the motor more appropriately than in the conventional technique.

The motor characteristic may be a rated current. In the determination step, a determination may be made as to whether or not the prescribed operation by the target motor is possible by determining whether or not the root mean square current is less than or equal to the rated current of the target motor corresponding to the average speed. In accordance with such features, since values including the effective current component and the reactive current component are compared with each other, it is possible to select the motor while taking into consideration the reactive current component flowing through the motor.

The motor characteristic may be a rated torque or a rated thrust force. The motor selection method may further comprise the continuous torque calculation step or the continuous thrust force calculation step of calculating the continuous torque or the continuous thrust from the root mean square current in consideration of the reactive current component, and in the determination step, a determination may be made as to whether or not the prescribed operation by the target motor is possible by determining whether or not the continuous torque or the continuous thrust force is less than or equal to the rated torque or the rated thrust force of the target motor corresponding to the average speed. In accordance with such features, since values that do not include the torque component or the thrust force component due to the reactive current component are compared with each other, it is possible to select the motor while taking into consideration the reactive current component flowing through the motor.

In the motor selection method, there may further be included the outputting step of outputting the notification signal to provide the notification of the determination result of the determination step. In accordance with this feature, it is possible to provide a notification to the user as to whether or not the target motor can be used.

What is claimed is:

1. A motor selection device, comprising:
    a processor; and
    a memory having stored thereon a motor characteristic corresponding to a speed of a target motor, the motor characteristic including a reactive current component, the processor being configured to:
    calculate an average speed from a speed waveform of a motor configured to drive a predetermined driven object, the driven object including a table and a workpiece supported on the table, at least one of the table or the workpiece configured to move in response to an actuation of the motor, the speed waveform being obtained when the driven object is made to perform a prescribed operation including movement of at least one of the table or the workpiece;
    calculate a root mean square current from a current waveform of the motor configured to drive the driven object, the current waveform being obtained when the driven object is made to perform the prescribed operation, the root mean square current being a value including a reactive current component and an effective current component;
    determine whether or not the prescribed operation by the target motor is within an operating zone, using the motor characteristic corresponding to the average speed, the reactive current component, and the effective current component; and
    notify a user whether or not the target motor can be used.

2. A motor selection device, comprising:
    a processor; and
    a memory having stored thereon a motor characteristic corresponding to a speed of a target motor, the motor characteristic including a reactive current component, the processor being configured to:
    calculate an average speed from a speed waveform of a motor configured to drive a predetermined driven object, the driven object including a table and a workpiece supported on the table, at least one of the table or the workpiece configured to move in response to an actuation of the motor, the speed waveform being obtained when the driven object is made to perform a prescribed operation including movement of at least one of the table or the workpiece;
    actuate the motor to move at least one of the table or the workpiece;
    calculate a root mean square current from a current waveform of the motor configured to drive the driven object, the current waveform being obtained when the driven object is made to perform the prescribed operation, the root mean square current being a value including a reactive current component;
    determine whether or not the prescribed operation by the target motor is possible, using the motor characteristic corresponding to the average speed, and the root mean square current;
    wherein:
    the motor characteristic is a rated current including the reactive current component and an effective current component; and
    the processor is configured to determine whether or not the prescribed operation by the target motor is possible by determining whether or not the root mean square current is less than or equal to the rated current of the target motor corresponding to the average speed.

3. The motor selection device according to claim 2, further comprising an output unit configured to output a notification signal to provide a notification of a determination result of the determination unit.

4. A motor selection method for a motor selection device including a memory configured to store a motor characteristic corresponding to a speed of a target motor serving as an object to be selected, the motor characteristic including a reactive current component, the motor selection method comprising:
    calculating, using a processor, an average speed from a speed waveform of a motor configured to drive a predetermined driven object, the driven object including a table and a workpiece supported on the table, at least one of the table or the workpiece configured to move in response to an actuation of the motor, the speed waveform being obtained when the driven object is made to perform a prescribed operation including movement of at least one of the table or the workpiece;
    calculating, using the processor, a root mean square current from a current waveform of the motor configured to drive the driven object, the current waveform being obtained when the driven object is made to perform the prescribed operation, the root mean square current being a value including a reactive current component and an effective current component;
    determining, using the processor, whether or not the prescribed operation by the target motor is within an operating zone, using the motor characteristic corresponding to the average speed, the reactive current component, and the effective current component; and notifying a user whether or not the target motor can be used.

5. A motor selection method for a motor selection device including a memory configured to store a motor characteristic corresponding to a speed of a target motor serving as an object to be selected, the motor characteristic including a reactive current component, the motor selection method comprising:

actuating a motor to move at least one of a table or a workpiece;

calculating, using a processor, an average speed from a speed waveform of the motor configured to drive a predetermined driven object, the driven object including the table and the workpiece supported on the table, the speed waveform being obtained when the driven object is made to perform a prescribed operation including the movement of at least one of the table or the workpiece;

calculating, using the processor, a root mean square current from a current waveform of the motor configured to drive the driven object, the current waveform being obtained when the driven object is made to perform the prescribed operation, the root mean square current being a value including a reactive current component;

determining, using the processor, whether or not the prescribed operation by the target motor is possible, using the motor characteristic corresponding to the average speed, and the root mean square current;

wherein:

the motor characteristic is a rated current including the reactive current component and an effective current component; and in the determination step, a determination is made as to whether or not the prescribed operation by the target motor is possible by determining whether or not the root mean square current is less than or equal to the rated current of the target motor corresponding to the average speed.

6. The motor selection method according to claim 5, further comprising an outputting step of outputting a notification signal to provide a notification of a determination result of the determination step.

* * * * *